United States Patent [19]

Badgley

[11] 4,221,192
[45] Sep. 9, 1980

[54] FUEL INJECTOR AND COMMON RAIL FUEL SUPPLY SYSTEM

[75] Inventor: Patrick R. Badgley, Columbus, Ind.

[73] Assignee: Cummins Engine Company, Inc., Columbus, Ind.

[21] Appl. No.: 919,408

[22] Filed: Jun. 26, 1978

Related U.S. Application Data

[63] Continuation of Ser. No. 755,648, Dec. 30, 1976, abandoned.

[51] Int. Cl.² ............................................. F02M 63/04
[52] U.S. Cl. ..................................... 123/456; 123/462; 123/473; 239/533.9; 239/585
[58] Field of Search ...... 123/32 EA, 32 AE, 139 BG, 123/139 AW, 32 JV, 139 AT, 139 DP, 140 FG, 140 MC, 139 E, 139 AZ; 239/584, 585, 533.3, 533.9

[56] References Cited

U.S. PATENT DOCUMENTS

| | | | |
|---|---|---|---|
| 1,975,624 | 10/1934 | Simmen | 123/139 BG |
| 2,065,272 | 12/1936 | Filehr | 123/139 AT |
| 2,117,105 | 5/1938 | Schimanek | 123/139 BG |
| 2,708,601 | 5/1955 | Links | 123/32 JV |
| 3,004,720 | 10/1961 | Knapp et al. | 239/533.3 |
| 3,587,547 | 6/1971 | Hussey et al. | 123/32 AE |
| 3,592,392 | 7/1971 | Huber | 239/585 |
| 3,662,721 | 5/1972 | Klein | 123/32 AE |
| 3,685,526 | 8/1972 | Hobo et al. | 123/32 EA |
| 3,718,283 | 2/1973 | Fenne | 239/533.9 |
| 3,827,409 | 8/1974 | O'Neill | 123/32 EA |
| 3,949,713 | 4/1976 | Rivere | 123/32 AE |
| 4,022,166 | 5/1977 | Bart | 123/32 JV |
| 4,092,964 | 6/1978 | Hofer et al. | 123/139 AT |

OTHER PUBLICATIONS

Published Patent Application, Serial Number 348782, published 5/11/43, Voit.

Primary Examiner—Charles J. Myhre
Assistant Examiner—Andrew M. Dolinar
Attorney, Agent, or Firm—Merriam, Marshall & Bicknell

[57] ABSTRACT

This disclosure deals with a fuel supply system for a compression ignition, internal combustion engine, which is simple in construction and inexpensive to manufacture. The system includes a plurality of fuel injectors, one injector for each combustion chamber of the engine, and a common fuel supply rail which is connected to all of the injectors. Means is provided to regulate the fuel pressure in the supply rail. The injectors are normally closed but they are sequentially actuated to inject fuel by operation of an injector control circuit. Each injector includes a pintle-type nozzle which normally is held closed by a force applying device, and the control circuit operates to remove the force applying device from each injector in turn. The nozzle of an actuated injector then opens by an amount that is a function of the pressure in the rail, and the quantity of fuel injected is related to the fuel pressure.

15 Claims, 5 Drawing Figures

FUEL INJECTOR AND COMMON RAIL FUEL SUPPLY SYSTEM

This is a continuation of application Ser. No. 755,648, filed Dec. 30, 1976, now abandoned.

BACKGROUND OF THE INVENTION

There are numerous types of fuel injection systems in use in internal combustion engines. In one type, the quantity of fuel injected by an injector in each operating cycle of the engine is controlled by the pressure of the fuel supplied to the injector. Such an arrangement has proven to be very advantageous because the pressure may be easily adjusted in response to various engine operating parameters. While this type of system has been successfully used on relatively large engines for trucks, such past systems have required relatively expensive and complicated parts, which has made them unsatisfactory for use in smaller relatively low cost engines.

OBJECTS AND BRIEF SUMMARY OF THE INVENTION

It is a general object of the present invention to provide an improved, low cost and uncomplicated fuel injector and fuel supply system which is particularly suited for relatively small engines.

In accordance with this invention there is provided a fuel injector for each combustion chamber of the engine, each injector including a fuel chamber, a nozzle leading from the fuel chamber to said combustion chamber, and a valve member movable to close and open the nozzle. A fuel passage is formed in the injector for carrying fuel under pressure to the fuel chamber, the fuel pressure acting on the valve member and tending to open the nozzle by an amount that is a function of the pressure of the fuel. The force of the fuel on the valve member is normally countered by a relatively high counter force which holds the valve member in the position where it closes the nozzle. To inject fuel, the counter force is reduced to a relatively low level which enables the fuel force to move the valve member and open the nozzle. The fuel system includes means for regulating the pressure in a rail leading to the injectors, and control means for actuating the injectors to inject fuel.

BRIEF DESCRIPTION OF THE DRAWINGS

The foregoing and other objects and features of the present invention will become apparent from the following detailed description taken in conjunction with the accompanying figures of the drawings, wherein.

DETAILED DESCRIPTION

Figure 1:
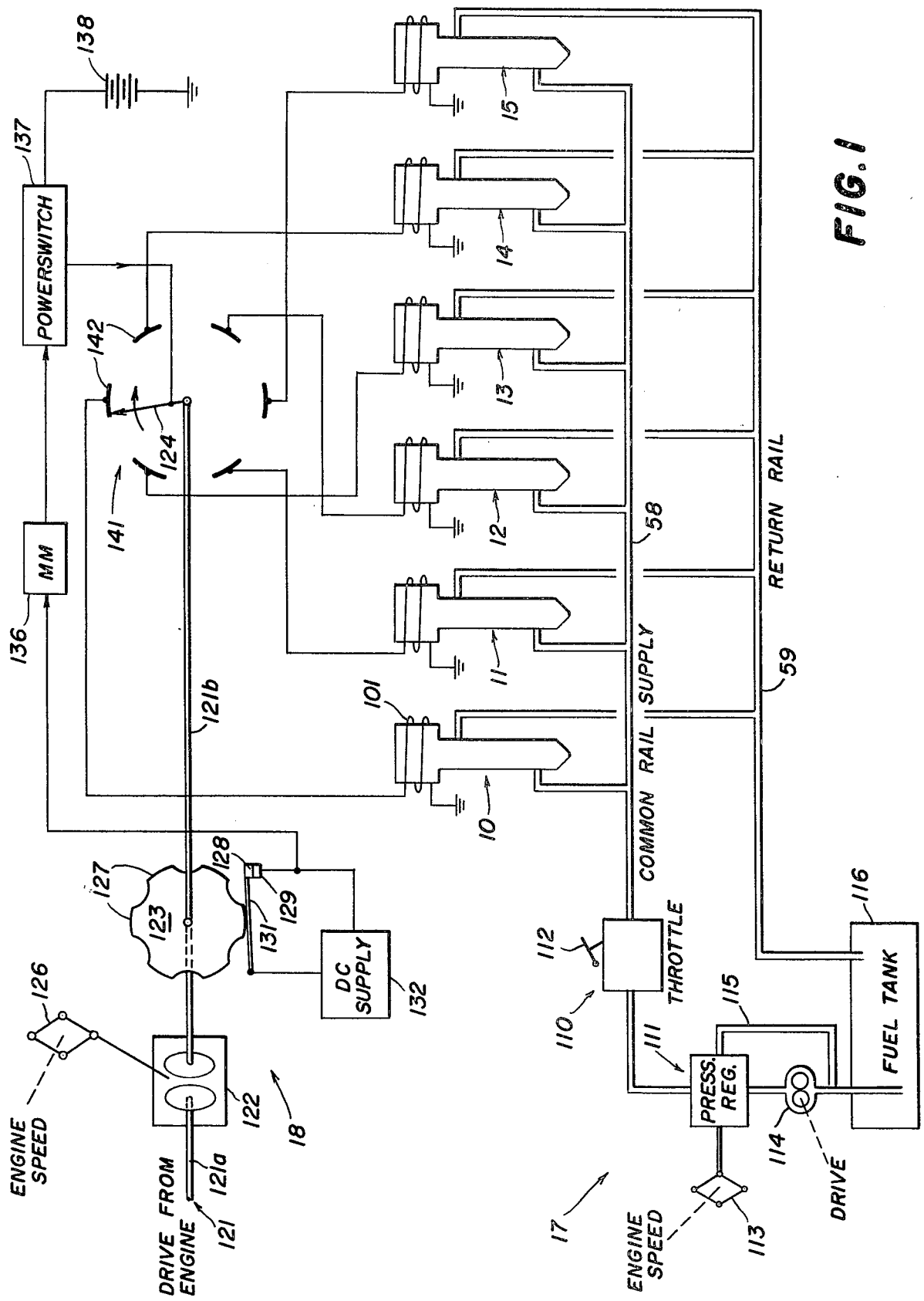
FIG. 1 is a schematic diagram of a fuel supply system in accordance with the present invention.

FIG. 1 illustrates a fuel supply system in accordance with the present invention designed for use in a six cylinder internal combustion engine. While a six cylinder reciprocating piston type of engine is illustrated in the drawings and described herein, it should be understood that the invention is also applicable to other types of engines, such as rotary engines, and that the engine may include fewer or more than six combustion chambers.

The system illustrated in FIG. 1 includes six injectors 10–15, a variable pressure fuel supply and pressure regulation system 17 for supplying fuel to the injectors 10–15, and a control circuit 18 for sequentially actuating the injectors 10–15 to inject fuel into the combustion chamber of the engine.

Figure 2:
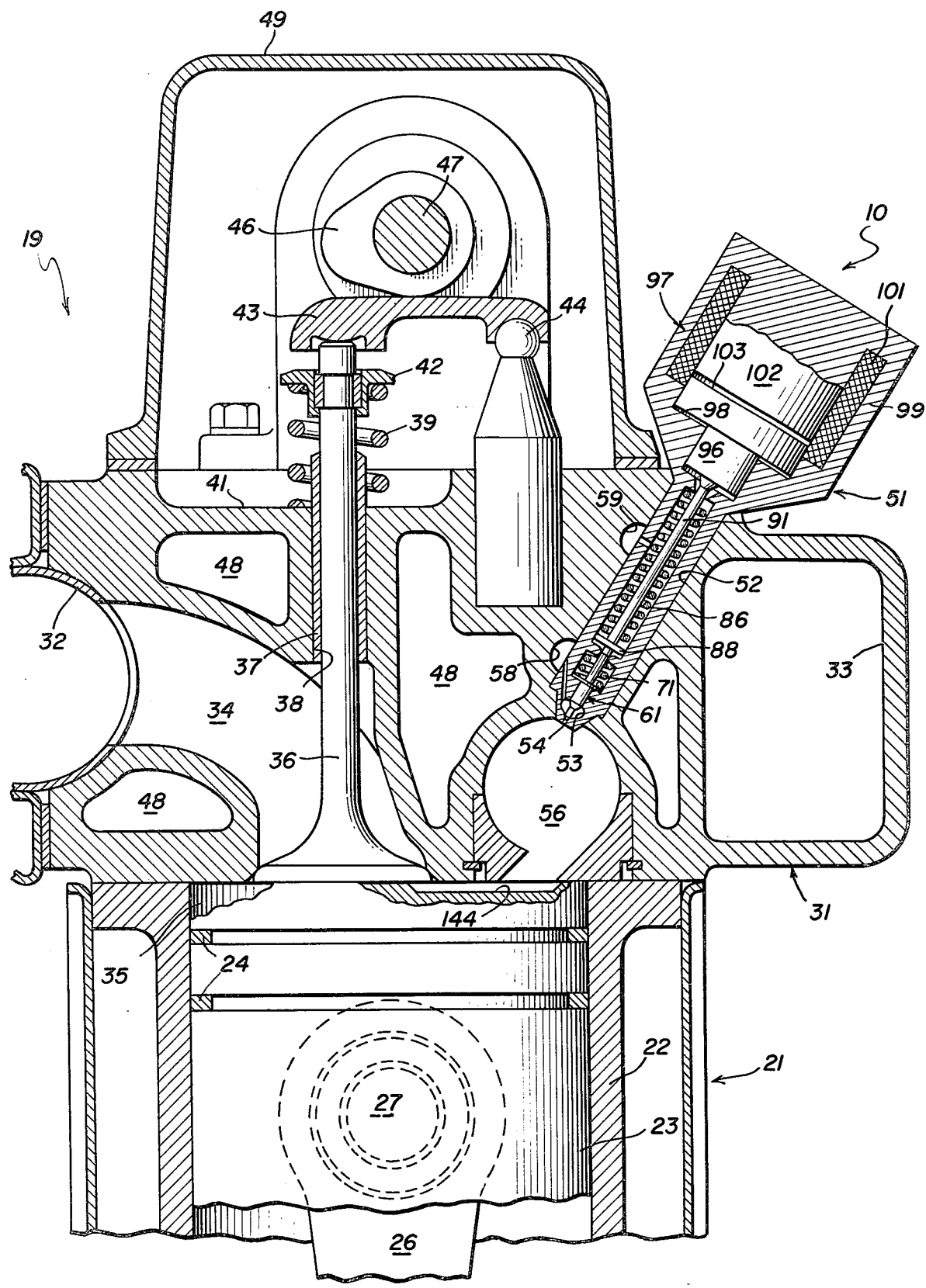
FIG. 2 is a sectional view of a fuel injector of the system, installed in an internal combustion engine.

FIG. 2 illustrates the injector 10 mounted in an engine 19. It should be understood that the other injectors 11–15 are similarly mounted in the engine 19, and that, in the present example, the engine includes a total of six in-line cylinders. The engine 19 includes an engine block 21 which supports a cylinder liner 22. A piston 23 is mounted for reciprocating motion in the liner 22 and has a number of piston rings on its outer periphery, two rings 24 being shown in FIG. 2. The piston 23 is fastened to a piston rod 26 by a wrist pin 27, the rod 26 also being connected to a crankshaft (not shown) in the usual manner.

The engine 19 further includes a head 31 having an exhaust manifold 32 and an air intake manifold 33. The manifolds 32 and 33 of course extend past all of the cylinders of the engine 19. An exhaust port 34 is formed in the head 31 and leads from the manifold 32 to the combustion chamber 35 in which the piston 23 reciprocates, and an exhaust valve 36 is mounted in the opening where the port 34 enters the combustion chamber 35. The valve 36 is reciprocably mounted in a sleeve 37 fastened in a hole 38 formed in the head 31, and a compression spring 39 urges the valve 36 upwardly to the position where it closes the exhaust port 34. The compression spring 39 is positioned around the stem of the valve 36 and it is mounted between a ledge 41 formed on the block 31 and a collar 42 which is secured to the valve stem. A rocker arm 43 engages the upper end of the valve stem and is pivotally mounted on a ball 44 which is supported by the engine block 31. A cam 46 is secured to and rotates with a cam shaft 47 and engages the upper surface of the rocker arm 43. As the cam shaft 47 rotates, a lobe of the cam 46 forces the rocker arm 43 in the counterclockwise direction as seen in FIG. 2 in order to open the exhaust port 34, such opening taking place periodically at the appropriate times in the cycle of the engine.

A similar air intake valve and port are also provided for each cylinder. A number of passages 48 are also formed in the block 31 of the engine for an engine coolant, and a cover 49 is mounted over the cam shaft.

Figure 3:
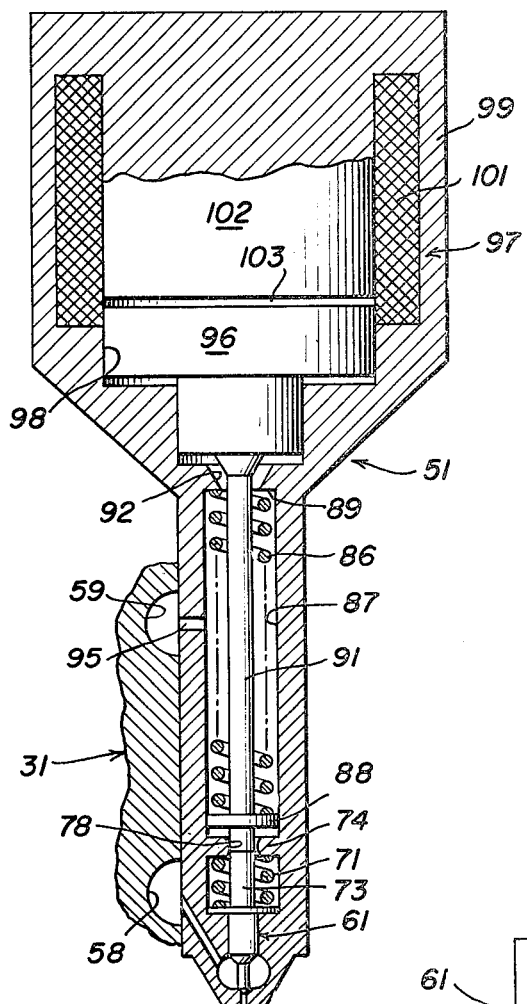
FIG. 3 is an enlarged sectional view of the injector shown in FIG. 2.
Figure 4:
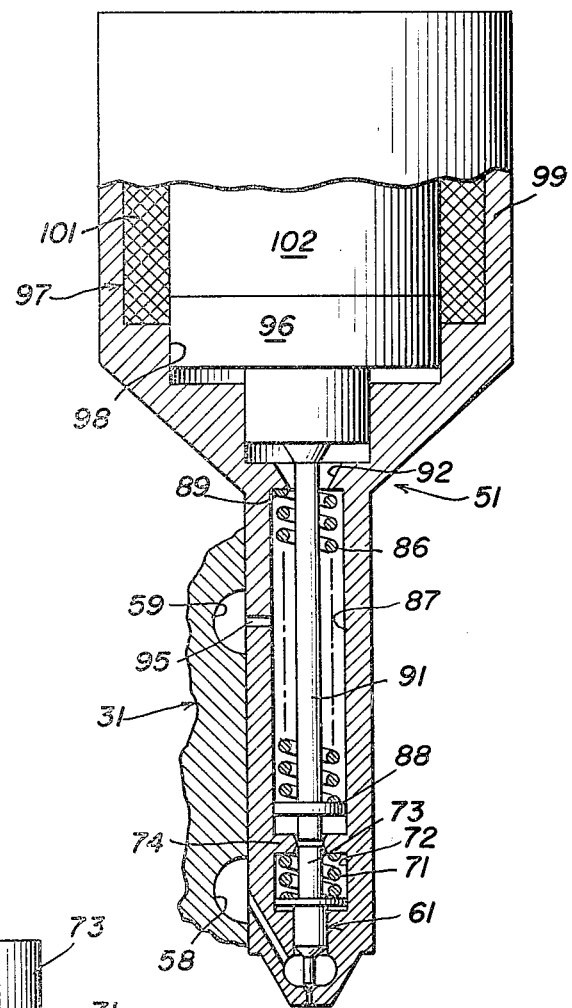
FIGS. 4 and 5 are further views of the injector showing different positions of some of the parts.

The injector 10 is also mounted in the block 31 above the combustion chamber 35. With reference to FIGS. 2, 3 and 4, the injector 10 includes an elongated injector body 51 which is tightly received in a bore 52 formed in the engine block 31. Adjacent its lower end, the injector body 51 has a fuel chamber 53 (see FIG. 5) formed therein, the chamber 53 having a generally spherical shape. An axial nozzle or fuel flow passage 54 is formed through the wall of the body 51 at the lower end of the injector and connects the fuel chamber 53 with a precombustion chamber 56 (FIG. 2) formed in the block 31. The precombustion chamber has a conventional design and is connected to the upper end of the combustion chamber 35. Another fuel flow passage 57 is formed in the injector body 51 and connects the fuel chamber 53 with a common fuel supply rail 58. The rail 58 may be formed by a drilled passage which extends longitudinally of the engine past all of the injectors 10–15. Another drilled passage forms a common fuel return rail 59 which also extends past all of the injectors 10–15.

The flow of fuel from the fuel chamber 53 through the nozzle 54 is normally blocked by a pintle-type valve including a needle valve 61 having a shank 62 (FIG. 5) which is slidably mounted in an axial bore 63 formed in the injector body 51. The valve 61 further includes an axially downwardly extending needle 64 which is formed on the lower end of the shank 62. The lower end of the needle 64 has a conical valve surface 66 which is adapted to seat in a mating conically shaped valve seat surface 67 formed on the injector body 51 around the nozzle 54. When the valve 61 is displaced downwardly in its closed position (FIGS. 1 and 2), the valve surfaces 66 and 67 engage and prevent flow of fuel from the chamber 53 to the nozzle 54. On the other hand, when the valve 61 is displaced upwardly slightly to a partially open position (FIGS. 4 and 5), fuel is able to flow through the flow area formed by the passage between the surfaces 66 and 67, and out of the nozzle 54. The amount of quantity of fuel flow in each cycle is a function of the flow area between the surfaces 66 and 67, the pressure of the fuel in the chamber 53, and the length of time the surfaces 66 and 67 are separated. In accordance with this invention, the time is constant and the pressure is varied. Further, the flow area is a function of the pressure. Consequently, a change in the pressure in the rail 58 effects changes both in the pressure of the fuel in the chamber 53 and in the flow area between the surfaces 66 and 67. A relatively small change in pressure will therefore produce a relatively large change in the quantity of fuel injected, enabling a more accurate control of the fuel metering.

Figure 5:
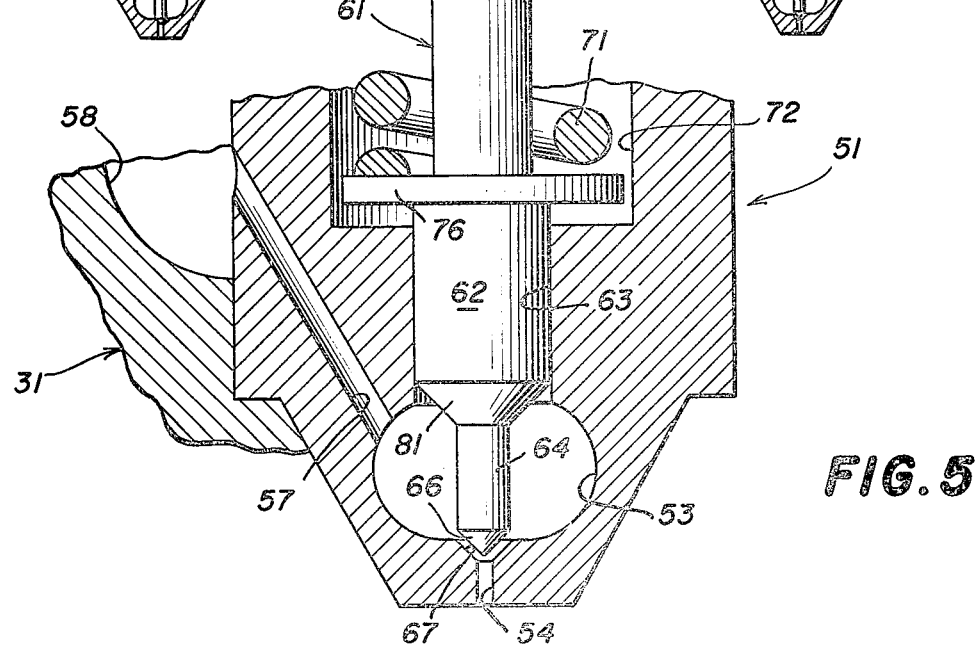

The valve 61 is urged or forced downwardly in the direction to close the flow passage between the surfaces 66 and 67 by a low level counter force applying means which, in the present instance, comprises a compression spring 71 positioned in a cavity 72 formed in the injector body 51. The spring 71 is coiled around a pin 73 formed on and extending upwardly from the shank 62 of the valve 61. At its upper end, the spring 71 engages a radially inwardly extending flange 74 (FIGS. 3 and 4) which forms the upper side of the spring cavity 72. At its lower end, the spring 71 engages a ring or washer 76 which is secured to the upper end of the shank 61. Thus, the counter force of the compression spring 71 acts on the washer 76 and urges both the washer 76 and the valve 61 downwardly. The flange 74 has an axial opening 78 formed therein which slidably receives the upper end of the pin 73. Consequently, the valve 61 is able to slide in the openings 63 and 78 and it is urged downwardly by the force of the compression spring 71. The pressure of the fuel in the chamber 53 acts on a conical surface 81 (FIG. 5) of the valve 61, formed between the shank 62 and the needle 64, and the amount of the fuel applied force tending to move the valve 61 upwardly is a function of the pressure of the fuel in the chamber 53 and the area of the surface 81 as seen from the lower end of the valve 61. When the valve 61 has moved upwardly and the surfaces 66 and 67 have separated as shown in FIGS. 4 and 5, the pressure of the fuel also acts on the surface 66.

A second higher level counter force applying means is also provided which normally urges the valve 61 downwardly to the closed position. The second force applying means comprises another compression spring 86 which is mounted in an elongated bore 87 formed in the injector body 51. The lower end of the spring 86 engages a washer or ring 88 which is located adjacent the flange 74. The ring 88 does not, however, engage the flange 74. The upper end of the spring 86 engages an inwardly extending flange 89 formed on the body 51 at the upper end of the bore 87. The ring 88 is secured to the lower end of a rod 91 which extends upwardly from the ring 88 through a hole 92 formed centrally of the flange 89. The rod 91 also extends downwardly from the ring 88 a short distance and, in the positions of the parts illustrated in FIGS. 2 and 3, the rod 91 engages the upper end of the pin 73 of the valve 61. It will be apparent that in the position of the parts illustrated in FIGS. 2 and 3, the force of the compression spring 86 is added to the force of the spring 71, and that the sum of the forces of the two springs push the valve 61 downwardly so as to engage the surfaces 66 and 67.

There is a snug sliding fit between the valve shank 62 and the surface of the opening 63 which is sufficient to prevent substantial leakage of fuel from the chamber 53, but some fuel does leak and fill the chambers 72 and 87. A passage 95 is formed through the wall of the injector body 51, which connects the chamber 87 with the return rail 59 and returns the leakage to a fuel supply tank.

The upper end of the rod 91 is secured to the plunger 96 of an electrical solenoid 97. The plunger 96 is movably mounted in a plunger cavity 98 formed in an enlarged upper part 99 of the injector body 51. The solenoid 97 further includes a coil 101 wound around a solenoid core 102 which in the present example forms part of the injector body 51. In the absence of current flow through the coil 101, there is little attaction between the core 102 and the plunger 96 and an air gap 103 exists between these two parts. The only attraction between the core 102 and the plunger 96 is due to residual magnetism of the parts. When the solenoid 97 is not energized, the force of the spring 86 is sufficient to move the rod 91 and the plunger 96 downwardly to the position shown in FIGS. 2 and 3 where the lower end of the rod 91 bears against the upper end of the valve 61. However, when current flows through the coil 101, the plunger 96 is attracted to the core 102 and the air gap 103 is closed by movement of the plunger 96 upwardly (FIG. 4). Of course, the rod 91 is also pulled upwardly against the force of the compression spring 86, and the lower end of the rod 91 is moved out of engagement with the upper end of the valve 61. This is the position of the parts shown in FIGS. 4 and 5. The operation of the injector will be further described hereinafter.

With reference again to FIG. 1, as previously mentioned, the other injectors 11–15 are indentical with the injector 10 illustrated in FIGS. 2–5. The fuel supply system 17 includes the common fuel supply rail 58 which is connected to supply fuel to all of the injectors 10–15. It will be apparent that the pressure of the fuel in the fuel intake passage 57 will be the same for all of the injectors because they are all connected to the common supply rail 58. The fuel pressure is controlled, in the present example, by a manually controlled throttle 110 and by an automatic fuel pressure regulator 11. The throttle 110 may, for example, be the foot pedal or accelerator of the engine, and the foot pedal is indicated by the reference numeral 112. The throttle 110 and the pressure regulator 113 may be generally of a type in common use and as illustrated in Reiners U.S. Pat. No. 3,159,152 which is assigned to the assignee of the present invention. The pressure regulator 111 is connected to be responsive to the speed of the engine 19, and includes a centrifugal mechanism indicated by the reference numeral 113. While the pressure regulator 111 may be mechanically similar to the existing pressure regulator, it should, of course, be adjusted to operate in the pressure range contemplated by the present invention, as described hereinafter. An engine driven gear pump 114 draws fuel from a fuel supply tank 116 and delivers the fuel, through the pressure regulator 111 and the throttle 110, to the common rail 58. The regulator 111 is a by-pass type which returns a portion of the pumped fuel through a passage 115 to the intake of the pump 114. The return rail 59 is also connected to the injectors 10-15 as previously mentioned, and it is connected to return the leaked fuel to the fuel tank 116. Thus, the gear pump 114 draws fuel from the fuel tank 116 and the pressure is automatically regulated by the pressure regulator 111 in response to engine speed, the throttle 110 further regulating the pressure in the supply rail 58, and this pressure being common to all of the injectors. The operator of the engine varies the fuel pressure to obtain a desired torque output from the engine.

The control circuit 18 includes a rotating shaft 121 which is formed in two segments 121a and 121b. The segment 121a is connected to be driven by the engine. The shaft segments 121a and 121b are connected by a coupling 122 and the segment 121b is connected to turn a cam 123 and a distributor rotor 124. The coupling 122 is designed to permit an angular adjustment in the relative positions of the two shaft segments 121a and 121b. The coupling 122 is connected to an engine speed responsive centrifugal mechanism 126 and automatically makes the adjustment in accordance with the engine speed.

The cam 123 includes a number of cam lobes 127, there being one cam lobe 127 for each of the injectors, and the lobes 127 are located to actuate switch contacts 128 and 129. The contact 129 is fixed and the other contact 128 is fastened to a flexible leaf 131 which is engageable by the lobes 127 as the cam 123 rotates. When a lobe 127 engages the leaf 131, as shown in FIG. 1, the contacts 128 and 129 are closed, and in the spaces between the lobes 127, the contacts 128 and 129 are open. The contacts 128 and 129 are connected across a DC supply 132 which may be a battery or another DC source.

The control circuit 18 further includes a monostable (one-shot) multivibrator 136 which has its input connected to be triggered by the opening or closing of the contacts 128 and 129. In the present instance, the multivibrator 136 is designed to be triggered each time the contacts 128 and 129 open. As is well known to those in the electronics art, each time the multivibrator 136 is triggered it generates an electrical pulse having a fixed time duration or width. The output pulse of the multivibrator 136 is connected to control operation of a power switch 137 which is connected between a battery 138 and the rotor 124. During the presence of each of the pulses from the multivibrator 136, the power switch 137 is closed and the positive pole of the battery 138 is connected to the rotor 124.

The rotor 124 forms part of a distributor 141 which has a plurality of segments equal in number to the number of injectors. In the present illustration, six segments 142 are provided, and each of the segments 142 is connected to the coil 101 of one of the injectors 10-15. In the position of the rotor 124 illustrated in FIG. 1, the rotor 124 engages the segment 142 which is connected to the coil 101 of the injector 10. When the power switch 137 is closed, the positive pole of the battery 138 is connected through the power switch 137, the rotor 124, a segment 142 and the coil 101. The other side of the coil 101 is connected to ground, and the negative pole of the battery 138 is connected to ground. Therefore, current from the battery 138 will be supplied to the coil 101 of the injector 10 for the time duration of the pulse received from the monostable multivibrator 136. At the termination of the multivibrator pulse, the power switch 137 will open and energizing current to the coil 101 will cease to flow even though the rotor 124 may still engage the distributor segment connected to the coil 101.

The following is a specific example of the operating parameters of a fuel supply system and an injector in accordance with this invention. The fuel pressure in the common supply rail varies in the range of approximately 2000 psi to 5000 psi. The pressure at which the fuel is regulated by the system shown in the previously mentioned U.S. Pat. No. 3,159,152 is around 200 psi, but that system may readily be modified to operate in the higher pressure range contemplated by this invention. The diameter of the needle 64 is approximately 3 mm, and the axial displacement of the valve 62 is approximately 0.25 mm. The force of the spring 71 alone on the valve 61, absent the force of the spring 86, is set relative to the horizontal projection of the surface 81 of the valve 62, so that the surfaces 66 and 67 separate when the chamber 53 pressure is approximately 2000 psi. The separation increases as the fuel pressure increases, and maximum separation is reached at approximately 5000 psi. At maximum separation, the upper end of the pin 73 engages the lower end of the rod 91. When the rod 91 is displaced downwardly as shown in FIG. 2 and both springs 71 and 86 apply a force on the valve 61, a fuel pressure of approximately 6000 psi would be required to lift the valve 61, but of course this high pressure is not reached.

In a two-cycle engine as illustrated herein, the firing sequence may be the cylinders 1-5-3-6-2-4 where the injector 10 is installed in the number one cylinder. Injection in a cylinder occurs as the piston approaches top-dead-center in the compression stroke, and the time duration of injection is approximately 0.00111 second. At 4500 rpm, this equals approximately 30° of a full cycle. The time of initiation and termination of injection, relative to the crank angle, may be adjusted by the coupling 122. At 2500 psi, approximately 4 mm$^3$ of fuel are injected, and at 5000 psi, approximately 32 mm$^3$ are injected.

The coupling 122, the cam 123, the contacts 128 and 129, and the rotor 124 and the segments 142, may be similar to the parts found in the distributor of a conventional spark ignition engine. The coupling 122 may be similar to the centrifugal mechanism which adjusts the spark timing in accordance with speed. The cam 123 and the contacts 128 and 129 may be similar to the cam and points in a distributor, and the rotor 124 and the segment 142 may also be similar to those found in a distributor. The multivibrator 136 and the power switch 137 are standard electronic components.

Considering the operation of the system as a whole, assume that the engine is operating and is driving the gear pump 114, the centrifugal mechanism 113, the centrifugal mechanism 126 and the shaft segment 121a. The gear pump 114 draws fuel from the tank 116, and the pressure regulator 111 controls the fuel pressure at its outlet in accordance with engine speed. The operator of the vehicle further adjusts the fuel pressure in the rail 58 using the foot pedal 112.

Assume that the angular position of the shaft 121 is such that the rotor 124 engages the segment 142 connected to the coil 101 of the injector 10 and that the contacts 128 and 129 are closed, as shown in FIG. 1. The coil 101 of the injector 10 will not be energized, and consequently, the force of the spring 86 will press the rod 91 downwardly against the upper end of the pin 73 of the valve 61. The combined forces of the two springs 71 and 86 will be sufficient to hold the valve 61 in the downward position as shown in FIGS. 2 and 3 where the valve surfaces 66 and 67 tightly engage and prevent the flow of fuel from the fuel chamber 53 through the nozzle 54. Continued rotation of the shaft 121 causes the cam lobe 127 to disengage the leaf 131, and the contacts 128 and 129 open. The change in the electrical potential on the line leading to the input of the multivibrator 136 triggers the multivibrator 136 and a pulse is generated. During the presence of the pulse from the multivibrator 136, the power switch 137 is closed, and the positive pole of the battery 138 is connected through the rotor 124 and the segment 142 to the coil 101 of the injector 10. Current flow through the coil 101 causes the plunger 96 of the solenoid 97 to move toward the core 102 and close the air gap 103. The rod 91 moves upwardly out of engagement with the valve 61, thereby removing the force of the spring 86 from the valve 61. The other spring 71 continues to produce a downwardly directed force on the valve 61. The pressure of the fuel in the fuel chamber 53 acts on the surface 81 and this pressure is sufficient to overcome the spring 71 and to move the valve 61 upwardly a short distance. The distance the valve 61 is moved upwardly is a function of the magnitude of the fuel pressure in the chamber 53, and this pressure is controlled using the throttle 110 and the pressure regulator 111. As soon as the valve 61 moves upwardly and the surfaces 66 and 67 separate, fuel from the fuel chamber 53 flows through the flow area between the surfaces 66 and 67 and through the nozzle 54, and it is sprayed into the precombustion chamber 56. The fuel mixes with the heated air in the precombustion chamber 56 and ignites, causing the ignited fuel and air mixture to flow from the chamber 56 and into the main combustion chamber 35. A recess 144 (FIG. 2) is formed in the upper surface of the piston to facilitate the flow out of the precombustion chamber 56. At the end of the pulse generated by the monostable multivibrator 136, the power switch 137 opens and the circuit connection between the battery 138 and the coil 101 is broken. The electromagnetic force on the plunger 96 ceases and the spring 86 is able to move the rod 91 downwardly again. The rod 91 engages the upper end of the pin 73 and the combined forces of the two springs 71 and 86 move the valve 61 downwardly to cause the surfaces 66 and 67 to engage and to abruptly terminate injection.

Continued rotation of the shaft 121 causes the rotor 124 to engage the next segment 142 which is connected, in the present illustration, to the injector 14 for the number five cylinder, and the next lobe 127 of the cam 123 engages the leaf 131, and the foregoing cycle of events is repeated to effect the actuation of the injector 14.

A fuel supply system in accordance with this invention has numerous advantages. It is simple in construction and relatively inexpensive to manufacture and install in an engine. The quantity of injected fuel is determined entirely by the pressure of the fuel in the common rail 58. The quantity of fuel injected is a function of the flow area between the surfaces 66 and 67 and of the pressure of the fuel in this flow area. Since a change in rail pressure changes both of these factors, a relatively small change in rail pressure produces a relatively large change in the injected fuel. Consequently, better control of the injected fuel is obtained.

It should be understood that the invention is not limited to a system exactly as set forth in the previously described specific example, and that changes may be made without departing from the scope of this invention. For example, various controls may be used for the pressure in the rail 58, and other controls may be used to actuate the injectors. Instead of a control circuit as illustrated, a system of cams could be used to move the rods 91 of the injectors. It is intended that the invention be limited only by the scope of the claims.

I claim:

1. An injector for use in a fuel supply system of an internal combustion engine wherein fuel is supplied to a common rail leading to a plurality of fuel injectors, said fuel being under a pressure which is regulated within a pressure range by a fuel pump, an engine speed responsive pressure regulator, and a throttle, said injector comprising:
   (a) an injector body having a fuel receiving passage and a fuel nozzle formed therein, said passage being adapted to receive said fuel under pressure and said nozzle being adapted to connect said passage with a combustion chamber for direct injection into said combustion chamber;
   (b) A valve member movably mounted in said body and normally located in a closed position to block the flow of fuel from said passage to said nozzle;
   (c) said valve member being a pintle type having an area thereof responsive to the pressure of the fuel in said passage and the force of the fuel on said area urging said valve member to an open position where a fuel flow area is formed from said passage to said nozzle;
   (d) force applying means operative to apply a force on said valve member urging said valve member to said closed position and thereby to close said fuel flow area, said force applying means being related to said area of said member and to said pressure range so that the position of said valve member and the size of said fuel flow area are functions of the fuel pressure;
   (e) and control means connected to said valve member for normally holding said valve member in the position where said flow area is closed and for periodically enabling said valve member to move to said open position and thereby to open said flow area for a period of time, whereby said common rail pressure controls said flow area and fuel is injected for said entire period of time and in an amount that is a function of said rail pressure.

2. An injector as in claim 1, wherein said passage includes a fuel chamber and said area of said valve member is exposed to fuel in said chamber.

3. An injector as in claim 1, wherein said force applying means comprises a compression spring connected to apply a force on said valve member.

4. An injector as in claim 1, wherein said control means comprises a force applying device operative to exert a force on said valve member, and means for periodically relieving said force applying device from said valve member.

5. An injector as in claim 4, wherein said force applying device includes a spring connected to apply a force on said valve member.

6. An injector as in claim 4, wherein said means for periodically relieving said force includes a solenoid.

7. An injector as in claim 1, wherein said valve member extends through said passage, said area of said valve member is exposed to fuel in said passage, said force of said fuel urging said valve member in one direction to form said fuel flow area, said force applying means comprising a spring connected to urge said valve member in the opposite direction to close said fuel flow area and said relation between said force applying means, said area of said member and said pressure range being such as to open said fuel flow area at the low pressure end of said range and the size of said fuel flow area being a function of said pressure up to the high pressure end of said range.

8. An injector as in claim 6, and further including electrical pulse generating means connected to said solenoid for generating pulses which periodically energize said solenoid.

9. An injector as in claim 8, wherein said pulses have a fixed time duration.

10. A fuel injector for use in an internal combustion engine having combustion chambers and a fuel supply including a supply rail and a fuel pressure regulator for regulating the fuel pressure in the rail within a range of pressure from a low value to a high value, comprising an injector body having a fuel chamber formed therein, said chamber being adapted to receive fuel under pressure from said supply rail, said body further having a nozzle formed therein which connects said fuel chamber with a combustion chamber of the engine, a pintle-type valve member movably mounted in a fuel flow area in said body adjacent said nozzle, said member being movable to one position where it closes said nozzle and to other positions where said fuel flow area from said chamber to said nozzle is at least partially open, said valve member having a surface area thereof exposed to the pressure of the fuel in said fuel chamber, whereby a fuel force is applied on said member to urge said member away from said one position, said fuel force being a function of said surface area and the pressure of the fuel in said fuel chamber, first force applying means operative to urge said member toward said one position and related to said fuel force such that said member is moved out of said one position at said low pressure valve and the amount of movement varies and is a function of said fuel pressure, and the amount of said movement varying the size of said fuel flow area, second force applying means operative to urge said member toward said one position, the sum of the forces of said first and second force applying means being greater than said fuel force at said high pressure value, and control means for periodically removing said second force applying means from said valve member.

11. A fuel injector as in claim 10, wherein said first force applying means comprises first spring means in said body and connected to said member, said second force applying means comprising second spring means in said body generally coaxial with said first spring means and connected to said member, the sum of the forces of said first and second spring means being greater than the force of the fuel on said valve member.

12. A fuel supply system for an internal combustion engine including a plurality of combustion chambers, comprising an injector for direct injection into each of said chambers, common rail fuel supply means for supplying fuel under pressure to said plurality of injectors and for regulating said pressure in a range of pressures, each of said injectors including body means forming a fuel flow passage and a valve seat, a valve member cooperable with said valve seat to control the flow area of said fuel flow passage, first force applying means urging said valve member to engage said seat and thereby to close said passage, control means enabling movement of said valve member away from said seat during a time period in each cycle, said valve member being movable away from said seat and having a surface area exposed to the pressure of said fuel and the force of the pressure on said surface area moving said valve member against said force applying means to open said passage during the entire time period, said surface area, the force of said force applying means, and said pressure range being related to cause said member to move away from said seat to a position that is a function of the fuel pressure, and the position of said member relative to said seat being determinative of the size of the flow area, whereby said common rail fuel pressure controls the size of said flow area and fuel is injected for said entire time period and in an amount that is a function of said rail pressure.

13. A system in claim 12, wherein said system further includes a second force applying means in each injector for normally holding said valve member in a position to close said flow passage, said control means further including power means responsive to cycling of the engine for sequentially actuating said second force applying means of said injectors to relieve said valve members of said second force applying means.

14. A system as in claim 13, wherein said first and second force applying means comprise first and second springs, respectively, and said power means includes a solenoid in each injector for relieving said valve member of the force of said second spring.

15. A system as in claim 12, wherein said valve means and said valve seat have mating conical surfaces, and said valve member has a further surface exposed to said fuel pressure.

* * * * *